May 28, 1929.   D. C. THOMPSON   1,715,315
SKEINING REEL
Filed June 25, 1927   2 Sheets-Sheet 1

INVENTOR:
Donald C. Thompson
by his attorneys

May 28, 1929.  D. C. THOMPSON  1,715,315
SKEINING REEL
Filed June 25, 1927  2 Sheets-Sheet 2

INVENTOR:
Donald C. Thompson
by his attorneys

Patented May 28, 1929.

1,715,315

UNITED STATES PATENT OFFICE.

DONALD C. THOMPSON, OF ROANOKE, VIRGINIA, ASSIGNOR TO THE VISCOSE COMPANY, OF MARCUS HOOK, PENNSYLVANIA, A CORPORATION OF PENNSYLVANIA.

SKEINING REEL.

Application filed June 25, 1927. Serial No. 201,526.

My invention relates to skeining reels and particularly to a collapsible reel for skeining artificial silk and the like. The object of my invention is to provide an improved construction by which the reel arms are accurately supported in predetermined position during the reeling operation, and readily collapsed for doffing the wound skein.

In the accompanying drawings—

Figure 1:
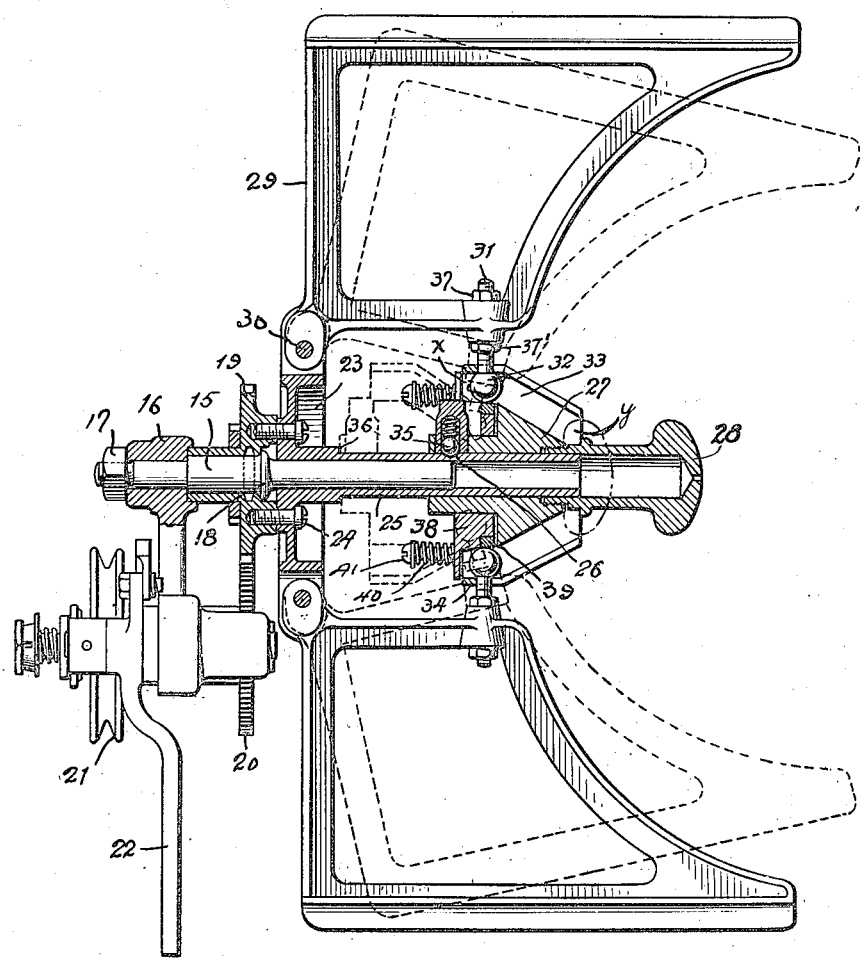
Fig. 1 is a vertical section through a reel in which my invention is embodied in one form.
Figure 2:
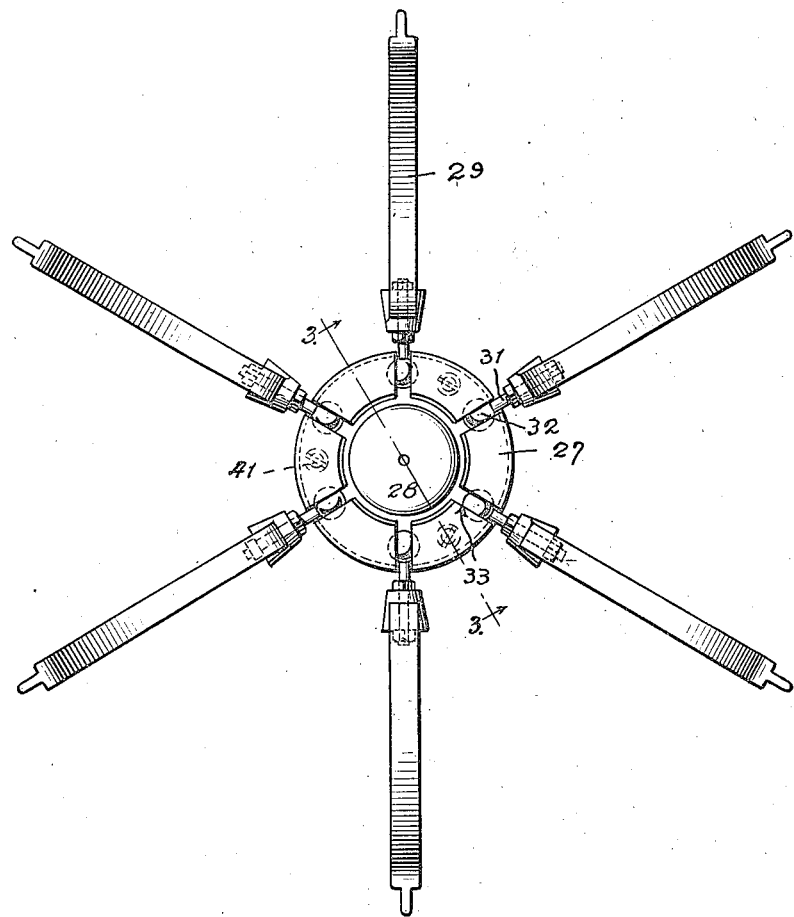
Fig. 2 is an end elevation thereof.
Figure 3:
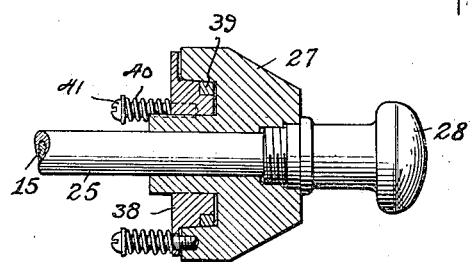
Fig. 3 is a section through the sliding cone on line 3—3, Fig. 2.

In the form here shown the reel is supported on an elongated pin or stud 15 secured in fixed position to the frame 16 by means of a nut 17. Between the collar 18 on the stud and the frame 16, is journalled gear 19 which meshes with a gear 20 fast on the spindle of drive pulley 21 controlled by the hand clutch lever 22. The reel hub 23 is fast with the gear 19, to which it is attached by machine screws 24.

The reel hub is integral with the hollow shaft 25 which has an extended bearing on the stud 15 and is exteriorly notched at 26 for a purpose hereinafter explained. Sliding on the shaft 25 is the reel collapsing cone-head 27. Into the outer end of the latter is screwed the axially pierced knob 28 which slides on the shaft 25.

The reel arms 29 are severally hinged to the hub 23 by hinge pins 30. Each arm is also supported by an adjustable pin 31 provided with a ball head 32 which engages an undercut and angled raceway 33 formed in the cone-head 27. The several raceways have reaches $x$ parallel with the shaft 25 and reaches $y$ which axially converge toward the outer or knob end of the cone-head 27. When the cone-head is pulled outward—that is to say away from the reel hub—the ball heads 32 of pins 31 move away from the reel shaft through reaches $y$ of the races 33 and enter the reaches $x$, where they are halted by the cross webs 34 which form limiting stops. The cone-head is releasably held in this position during the reeling operation, by a latch of any appropriate type, for example by a spring pressed ball 35 carried by the cone-head and engaging, in this position, the notch 26 in the reel shaft 25.

When the reeling operation is complete, and a skein is ready to be doffed, the operative pushes inward the knob 28, causing the cone-head to slide along the shaft 25 toward the reel hub. This causes the ball heads 32 of the supporting pins 31 to travel axially in the converging reaches $y$ of raceways 33, thus swinging the several reel arms on their hinges to the collapsed position indicated in dotted lines in Fig. 1. The inward travel of the cone-head is halted by the shoulder 36 on the shaft 25.

Note that when the knob 28 is thus pushed inward to collapse the reel, the operative's hand is in convenient position to rise between the reel arms and remove the now slack skein from the reel.

The pins 31 are threaded and are provided with nuts 37 and 37', the latter serving as inner abutments for the arms 29 to determine the position of the arms on the pins. The nuts 37 lock the arms against the abutment nuts 37'. The two nuts on each pin therefore afford a means for adjustably fixing the arms with respect to the pin supports 31. Once the arms are given a setting on the pins, the return of the arms to exactly the same position after each doffing operation and the maintenance of them therein during winding depend upon the accurate and snug confinement of the pin heads 32 in the reaches $x$. Any looseness would cause a variation in the outer diameter of the arms during winding. The reaches $x$ are, for that reason, provided with an adjustable bearing wall, described hereinafter, to take up slack caused by wear. This take-up is automatic. If the take up changes the radial spacing of the pinheads from the axis of the reel, the arms may be given a new setting on the pins by shifting nuts 37, 37' to compensate for the change, thus keeping the over-all diameter constant.

From this, it will be seen that the construction is extremely simple, readily operated and easily kept in proper condition for good reeling. It automatically prevents looseness or play between the cone head and reel arms and has provision for easy adjustment of the relative positions of the arms and their supports to give precisely the desired over-all diameter.

Should the pin heads become worn to an objectionable extent, the pins are readily replaced by releasing lock nuts 37, lifting the reel arms 29 free from the pins, unscrewing the knob 28, and withdrawing the worn pins from the knob end of the raceways 33. When thus released from the reel arms, the operating head 27 itself may be readily withdrawn from the shaft 25 and may be replaced by a new head.

A certain amount of wear between the pin heads 32 and the raceways 33 is inevitable. To take this up and thus maintain the parts snugly engaged when the reel arms are in extended position, the inner face of the cone-head 27 may be recessed to receive a sliding collar 38, the periphery of which forms the inner bearing surface of reaches $x$ of the several raceways 33. A ring 39 of hardened steel let into the inner margins of this bearing surface of the collar, is slightly tapered (say at a 5° taper) to wedge the pin heads 32 against the outer walls of the several raceways. The collar is yieldingly thrust toward the body of the cone by springs 40 bearing against the back of the collar and confined by the heads of pins 41 which are tapped into the body of the cone-head. This take-up collar gives the accurate and snug confinement of the pin heads 31, as mentioned above, and automatically prevents all slack between the cone-head and the reel arms when the latter are in operating or skeining position; and insures the winding of a full skein, since on wear the reel arms are displaced slightly outward by the take-up sleeve.

Certain novel and advantageous features of the reel drive shown in the drawing are not claimed herein, since they have no proper relation to the reel construction per se which constitutes the subject of the subjoined claims. The reel drive constitutes the subject of a separate invention, the right to patent on which is hereby reserved.

While I have shown a preferred construction of the reel and its collapsing mechanism, various modifications will readily occur to those dealing with the subject which embody the underlying thoughts which I claim as my invention.

I claim—

1. A collapsible skeining reel for artificial silk and the like, comprising a reel shaft having a hub, an operating head slidable on said shaft and having axially converging raceways, in combination with reel arms pivoted to said hub and having supports slidably engaged in the raceways of the operating head, and means adapted to receive said supports from said converging ways and to hold said supports to insure a reel of definite predetermined diameter when the operating head is shifted in one direction.

2. A collapsible skeining reel for artificial silk and the like, comprising a reel shaft having a hub, an operating head slidable on said shaft and having raceways which afford reaches substantially parallel to the reel axis and reaches communicating therewith and converging toward the reel axis, in combination with reel arms pivoted to said hub and having supports slidably engaged in the raceways of the operating head.

3. A collapsible skeining reel for artificial silk and the like, comprising a reel shaft having a hub, an operating head slidable on said shaft and having axially converging raceways, in combination with reel arms pivoted to said hub and having supports slidably engaged in the raceways of the operating head, and means adapted to receive said supports from said converging ways and to hold said supports to insure a reel of definite predetermined diameter when the operating head is shifted in one direction, together with means releasably maintaining the parts in the latter position.

4. A collapsible skeining reel for artificial silk and the like, comprising a reel shaft having a hub, an operating head slidable on said shaft and having axially converging raceways, in combination with reel arms pivoted to said hub and having supports slidably engaged in the raceways of the operating head, and means adapted to receive said supports from said converging ways and to hold said supports to insure a reel of definite predetermined diameter when the operating head is shifted in one direction, together with means positively limiting the travel of the operating head in opposite direction.

5. A collapsible skeining reel for artificial silk and the like, comprising a hollow reel shaft having a hub at one end, an operating head slidable on the opposite end of said shaft, and having raceways axially converging toward said opposite end of the shaft, in combination with reel arms hinged to said hub and having supports engaged in said raceways in the operating head, together with a fixed stud on which the shaft rotates, and a gear journalled on said stud and rigid with the reel hub.

6. In a collapsible skeining reel, a group of reel arms, an operating head having raceways converging toward the reel axis, and supports for the several arms engaged in the several raceways, and means for varying the relative positions of said supports and said reel arms to vary the over-all diameter of the reel.

7. In a collapsible skeining reel, hinged reel arms having elements in a sliding engagement with an operating head, said head comprising raceways inclined to the reel axis, together with a take-up member arranged at the outer ends of said raceways and coacting with the head-engaging elements of the reel arms to take up wear between the parts.

8. In a collapsible skeining reel, a reel-operating head having raceways comprising reaches inclined to the reel axis and reaches substantially parallel with the reel axis, pivoted reel arms having members engaged in said raceways, and means forming a bearing surface automatically pressed into engagement with said members in the reaches substantially parallel with the reel axis to take up wear between the parts.

9. In a collapsible skeining reel, a reel-operating head having undercut raceways, pivoted reel arms having members engaged in said raceways, and take-up means cooperating with said members to hold the latter snugly against the undercut surfaces of said raceways when the reel arms are in extended or skein winding position.

10. In a collapsible skeining reel, a reel-operating head having undercut raceways, pivoted reel arms having members engaged in said raceways, and spring-pressed take-up means cooperating with said members to hold the latter snugly against the undercut surfaces of said raceways when the reel arms are in extended or skein winding position.

In testimony whereof I have signed my name to this specification.

DONALD C. THOMPSON.